United States Patent [19]

Swonger

[11] Patent Number: 5,428,492
[45] Date of Patent: Jun. 27, 1995

[54] CURRENT DRIVER HAVING VOLTAGE TRANSITION FAILURE-BASED SHORT CIRCUIT PROTECTION CIRCUIT

[75] Inventor: James W. Swonger, Palm Bay, Fla.

[73] Assignee: Harris Corporation, Melbourne, Fla.

[21] Appl. No.: 930,737

[22] Filed: Aug. 14, 1992

[51] Int. Cl.⁶ .............................................. H02H 3/14
[52] U.S. Cl. ........................................ 361/18; 361/89; 307/52; 307/130; 323/268
[58] Field of Search ...................... 361/42, 86, 88, 89, 361/68; 323/268, 275, 276, 285, 350, 351; 307/52–56, 62, 72, 130, 131

[56] References Cited

U.S. PATENT DOCUMENTS

| 4,355,277 | 10/1982 | Davis et al. | 323/351 |
| 4,926,283 | 5/1990 | Qualich | 361/103 |
| 4,937,697 | 6/1990 | Edwards et al. | 361/18 |

Primary Examiner—A. D. Pellinen
Assistant Examiner—Ronald W. Leja
Attorney, Agent, or Firm—Charles Wands

[57] ABSTRACT

A current driver has a short circuit protection circuit which monitors the magnitude of the current driver's output voltage. The protection circuit looks for the failure of the output voltage to either change to a prescribed non short-circuit representative value within a prescribed time window after the onset of a voltage transition at the input node, or to maintain that value as dictated by the input signal. If either of these conditions occurs, the protection circuit takes action to reduce the driver's output current to a relatively small 'short circuit' current.

4 Claims, 3 Drawing Sheets

CURRENT DRIVER HAVING VOLTAGE TRANSITION FAILURE-BASED SHORT CIRCUIT PROTECTION CIRCUIT

FIELD OF THE INVENTION

The present invention relates in general to signal processing circuits and is particularly directed to a current driver circuit having very low output impedance and while being capable of controllably limiting output current to a prescribed minimal value in the event of a short circuit output condition.

BACKGROUND OF THE INVENTION

A number of signal processing environments, such as spaceborne communication systems, require robust and high precision signalling component and operational parameter capabilities. In some applications, specified transmission link parameters require that signal (current) driver components have an extremely small output impedance (e.g. on the order of ten ohms), but still be capable of limiting output current to very low values (e.g. on the order of one hundred milliamps) in the presence of a short circuiting output load. Unfortunately, conventional mechanisms that have been employed to limit the magnitude of short circuit output current, including the insertion of current-limiting resistors or the installation of a foldback current limiting circuit, also effectively prevent the driver circuit from delivering a large magnitude output current required at the low end of its dynamic range.

SUMMARY OF THE INVENTION

In accordance with the present invention, the above-described problem is successfully addressed by means of a short circuit (overcurrent) protection circuit which monitors the magnitude of the current driver's output voltage. The protection circuit looks for the failure of the output voltage to either change to a prescribed non short-circuit representative value within a prescribed time window after the onset of a voltage transition at the input node, or to maintain that value as dictated by the input signal. If either of these failure conditions occurs, the protection circuit takes action to reduce the driver's output current to a relatively small 'short circuit' current.

More particularly, when the magnitude of the input signal voltage changes or transitions from a first value to a second value (for example a high-to-low input signal swing), a controllable current supply circuit is operated so as to cause the current driver to supply a drive current of a first, relatively large, magnitude to the driver's output node. The voltage at the output node is monitored for the occurrence of an expected low-to-high output transition (a departure from zero or ground) that should follow or track this input swing. As long as the output voltage value changes to at least an expected threshold within a prescribed time-out window, the current driver continues to supply the first, relative large magnitude output current. However, if, at the time of the input voltage transition, the output node is effectively short circuited (grounded), then the voltage level at the output node will have failed to transition from the first state (ground) within the time-out window. In response to the such an output voltage transition failure, the current driver is controlled so as to reduce the magnitude of drive current supplied to the output node to a minimum 'short-circuit' current level.

For this purpose, the current driver comprises a first controllable current source and a second controllable current source connected in parallel to a current output transistor circuit. The second controllable current source is operative to supply a current having a magnitude that is significantly larger than the magnitude of the current supplied by the first controllable current supply circuit. The first current supply circuit essentially supplies only the minimum 'short circuit'0 current.

Both the first and second controllable current supply circuits supply current to the output node in response to the input transitioning from a first value to a second value; however, in response to the voltage level at the output node failing to change after the expiration of the time-window subsequent to the input signal transition, indicating that the output node is effectively shorted (to ground), the second controllable current supply circuit is disabled, thereby terminating its supply of the large valued or main output drive current, so that the only current supplied to the output node is the minimal 'short current' value provided by the first current supply circuit.

Additionally, should a short circuit condition not manifest itself until after the expiration of the time-out window, then, in response to the magnitude of the output voltage dropping to a short circuit-representative value (ground), the same control mechanism will disable the second controllable current supply circuit, so as to terminate its supply of the large valued current, thereby limiting the current supplied to the output node to the 'short circuit' value provided by only the first current supply circuit.

Thus, rather than continuously performing a current-limiting function as do the prior art mechanisms, the present invention is dynamic, reducing output current only as necessary, based upon the magnitude of the current driver's output voltage. The protection circuit looks for the failure of the output voltage to either change to a prescribed non short-circuit representative value within a prescribed time window after the onset of a voltage transition at the input node, or to maintain that value as dictated by the input signal. If either of these conditions occurs, the protection circuit turns off the current driver's main current generator, so as to limit the driver's output current to a relatively small 'short circuit' current.

DETAILED DESCRIPTION

Figure 1:
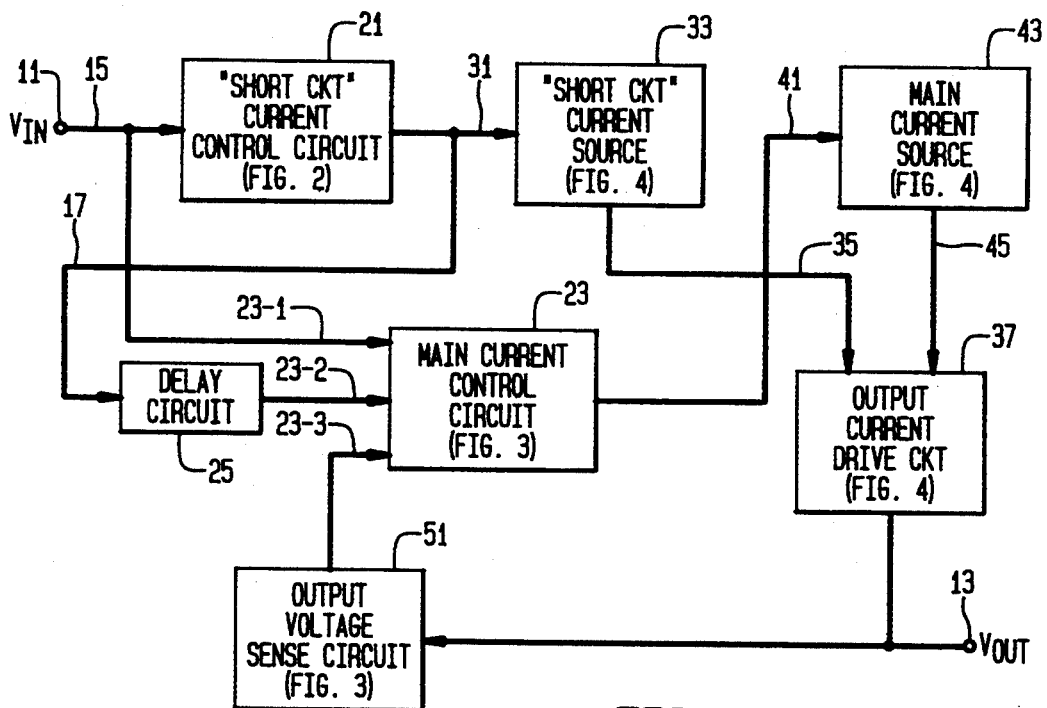
FIG. 1 is a diagrammatic illustration of a current driver having a voltage transition failure-based short circuit protection circuit in accordance with the present invention.

Referring now to FIG. 1 a current driver having a voltage transition failure-based short circuit protection circuit in accordance with the present invention is diagrammatically illustrated as comprising an input node 11 to which an input signal is applied, and a current-driving output node 13 to which downstream signal transmission and processing components are to be coupled. In order to facilitate the present description, the circuit architecture and components shown and described herein are associated with single polarity signal variations (e.g. positive polarity signalling between a first, relatively low (L) reference voltage, such as ground or zero volts, and a second, relatively high (H) reference voltage, such as +5 volts. To accommodate both positive and negative polarity signal excursions, a complementary circuit architecture is coupled in parallel with the positive signal circuit, and operated in push-/pull fashion with the positive polarity portion, so that the output current driver circuitry associated with a respective polarity portion is selectively gated on/off in accordance with the signal polarity of interest.

Figure 2:
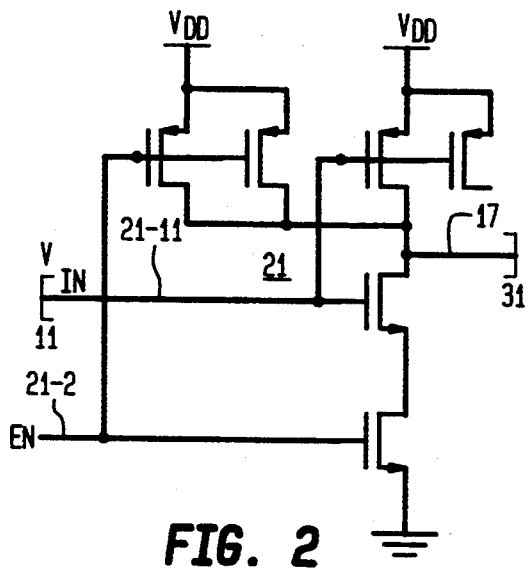
FIG. 2 schematically illustrates the minimal or 'short circuit' current supply control circuit 21 of the current driver circuit of FIG. 1.

Input node 11 is coupled via link 15 to a first current supply control circuit 21, which is operative to selectively enable or turn on a relatively low or 'short circuit' current generator or source 33. To accommodate tri-state circuit operation, first current supply control circuit 21 may be configured as schematically shown in FIG. 2 as a dual input NAND gate circuit having a first input 21-1 coupled via link 15 to input node 11 and a second input 21-2 coupled to receive a enabling signal EN, through which the current driver is externally enabled by a supervisory controller, not shown.

Input node 11 is further coupled to a first input 23-1 of a second current supply control circuit 23 (shown schematically in FIG. 3) which is operative to selectively enable or gate on a relatively large or main current generator 43 that supplies the main output current of the current drive circuit of FIG. 1. A second input 23-2 of current supply control circuit 23 is coupled to the output of a delay or time-out circuit 25, the input of which is coupled via link 17 to the output of first current supply control circuit 21. Time-out circuit 25 serves to prevent the voltage at output node 13 (which is monitored to determined the presence of a short circuit condition) from affecting the magnitude of output current being supplied from node 13 during a prescribed time-out window following a (high-to-low) voltage transition at input node 11. A third input 23-3 of current supply control circuit 23 is coupled to the output of a sense circuit 51, which serves to monitor the voltage at output node 13, in order to detect the occurrence of a short circuit output condition.

Figure 3:
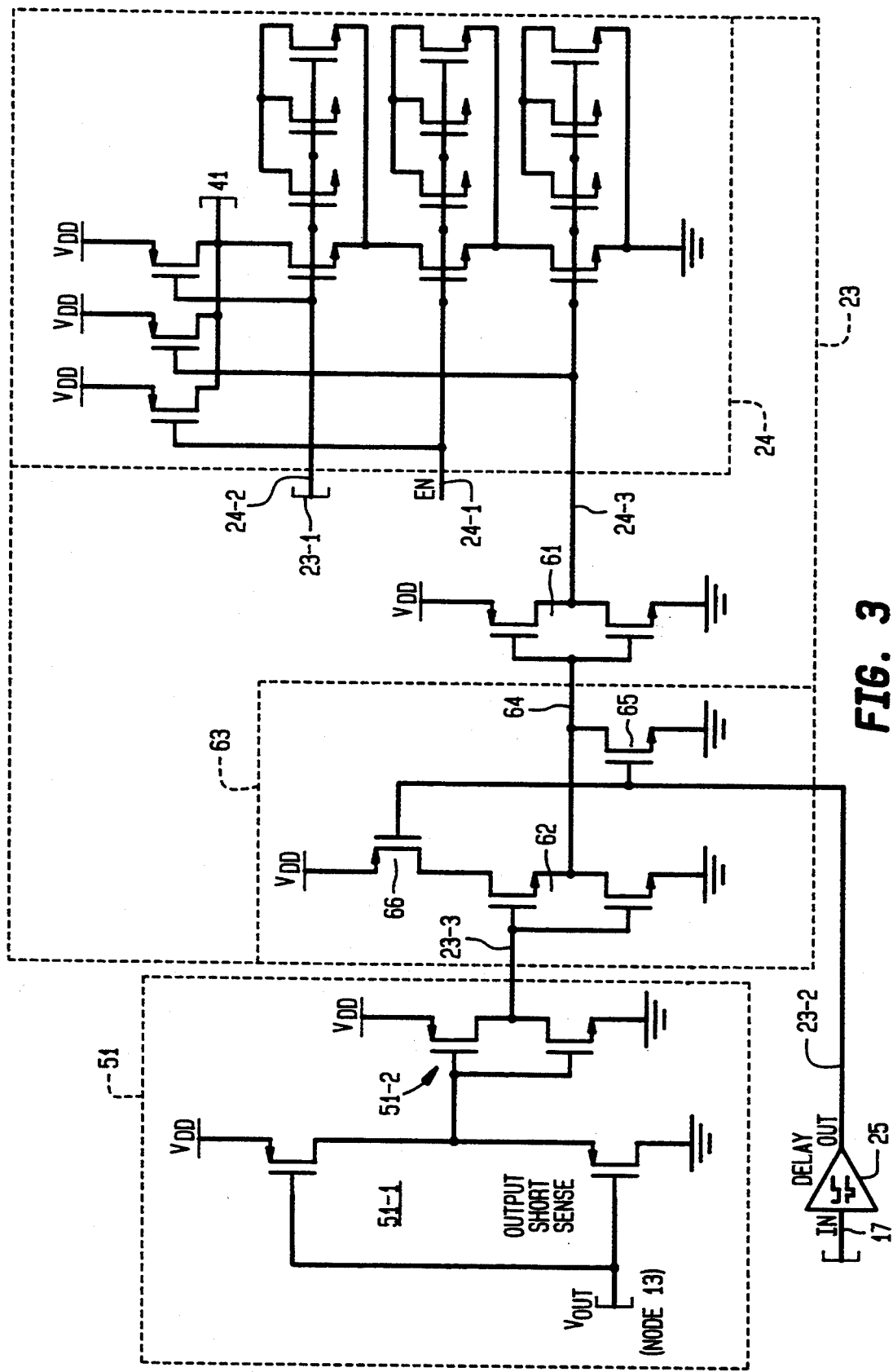
FIG. 3 schematically illustrates the main current supply control circuit 23 of the current driver circuit of FIG. 1.

As shown schematically in FIG. 3, sense circuit 51 is comprised of a set of cascaded inverter drivers 51-1, 51-2, which supply an output to control circuit 23 representative of the state of output node 13. If the voltage at output node 13 has a first state (e.g. a high voltage such as +5 volts), the output of sense circuit 51 has a first state; if the voltage at output node 13 has a second state (e.g. a low voltage or signal ground), the output of sense circuit 51 has a second state. In effect, sense circuit 51 senses a short circuit condition by monitoring whether the output voltage at node 13 has changed from ground or zero to a positive voltage in response to an input transition for that purpose. (If the output voltage is intended to be zero volts or ground, the need to monitor the output node for a high voltage level is unnecessary, since the output node voltage level effectively corresponds to a short circuit-representative voltage level.)

Figure 4:
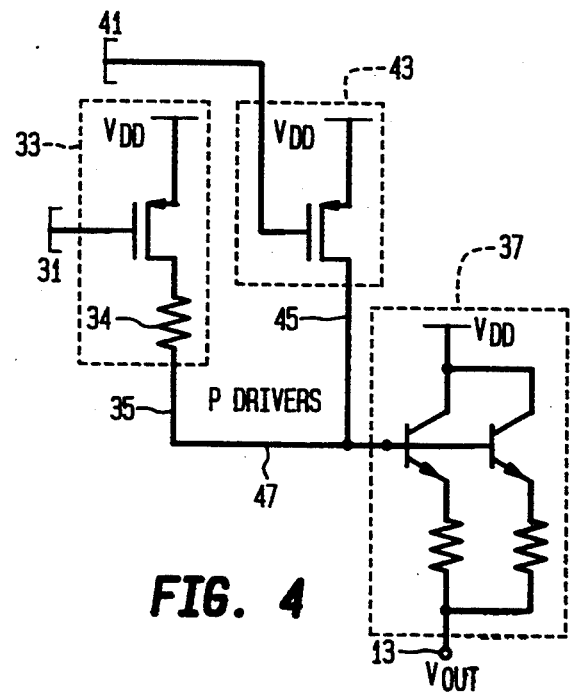
FIG. 4 schematically illustrates the circuit configuration of controllable current sources 33 and 43 of the current driver of FIG. 1.

The output of first current supply control circuit 21 is coupled to the control input 31 of a first controllable, relatively low magnitude current source 33, the output 35 of which is coupled to an output current supply circuit 37. The output of second current supply control circuit 23 is coupled to the control input 41 of a second controllable, relatively large magnitude current source 43, the output 45 of which is summed with the output 35 of first controllable current source 35 at the control input of output current supply circuit 37. As schematically illustrated in FIG. 4, each of first and second controllable current sources 33 and 43 may comprise a gated FET driver transistor circuit, the outputs of which are summed at node 47 to provide base drive for a bipolar transistor circuit of which output current supply circuit 37 is comprised, or the outputs may be summed directly as the device drive output. The output of relatively low magnitude or 'short circuit' current supply transistor 33 is current-limited via a coupling resistor 34 and the $I_{DS(ON)}$ of the transistor.

Referring again to FIG. 3, second current supply control circuit 23 is shown as comprising an inverter 61, to which the output of an inverter 62 of logic (NAND) gate 63 is coupled via link 64. Gate 63 further includes N-channel transistor 65 and P-channel transistor 66 coupled in circuit with the output of delay circuit 25 and with the drain bias path of inverter 64, respectively. Logic gate 63 operates such that as long as at least one of its inputs, namely the output of inverter 51-2 within sense circuit 51 and the output of time-out circuit 25, is high, then the voltage level on link 64 as the gate input to inverter 61 remains low, so that the output of inverter 61, which is coupled as a first input 24-1 of a three input NAND gate circuit 24, is high. If the outputs of both inverter 51-2 and delay circuit 25 are both low, however, the level on link 64 goes high, causing the output of inverter 61 to go low.

Again, to accommodate tri-state circuit operation, second current supply control circuit 23 may be configured as a multi-input NAND gate circuit 24 having a first input 24-1 coupled to receive a enabling signal EN, through which the current driver is externally enabled by a supervisory controller, not shown. A second input 24-2 of NAND gate circuit 24 is coupled to input node 11, while a third input 24-3 is coupled to the output of inverter 61.

OPERATION

Figure 5:
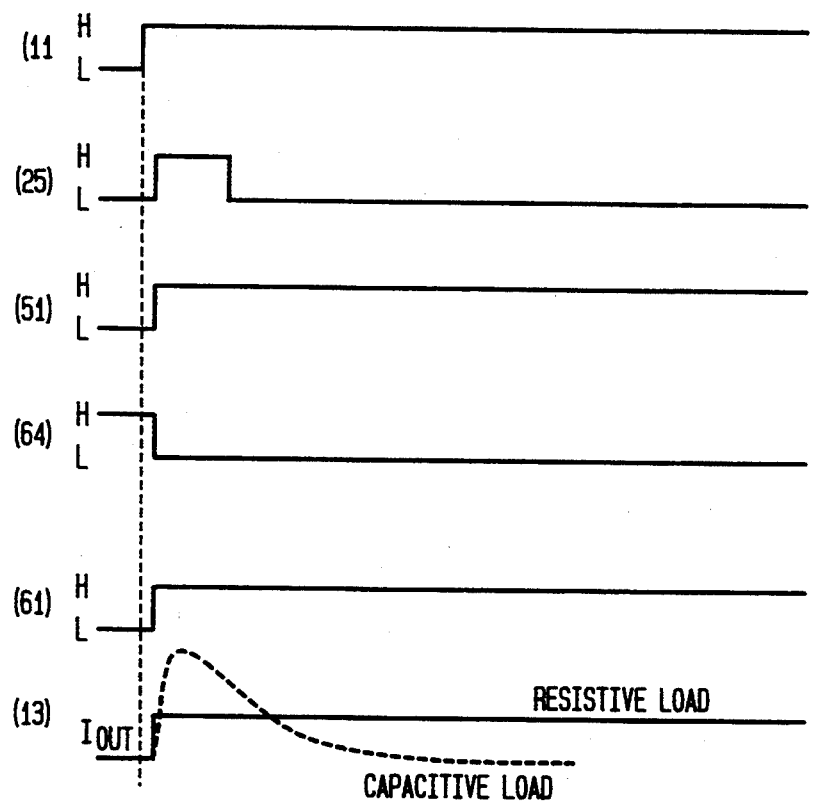
FIGS. 5 and 6 are timing diagrams associated with the operation of the current driver circuit of FIGS. 1-4.
Figure 6:
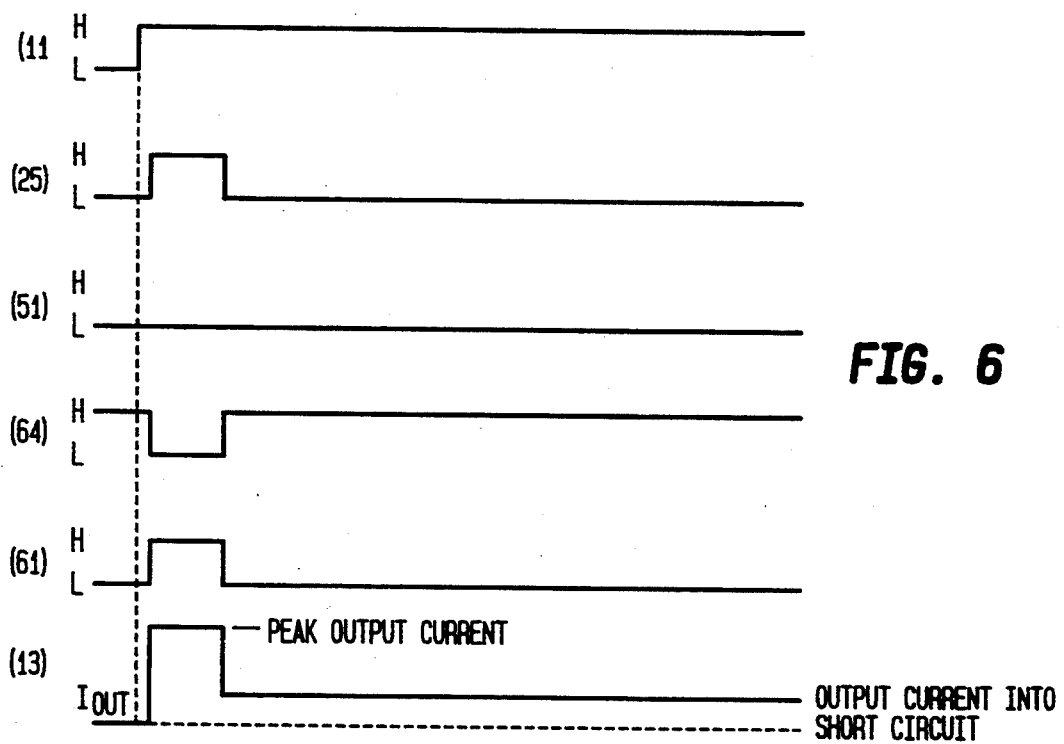

Operation of the current driver circuit described above may be facilitated by reference to the timing diagrams of FIGS. 5 and 6, which show respective sets of voltage levels associated with a non-shorted condition and a short circuit condition of output node 13. In particular, the respective signals shown in FIGS. 5 and 6 are parenthetically referenced to respective nodes within the circuit diagrams of FIGS. 1-4.

NON-SHORTED OUTPUT (FIG. 5)

Assuming an intended high-to-low input signal transition for current drive operation of the circuit and no shorting discontinuities in the output load at node 13, then, in response to a (high-to-low) transition of the input voltage V11 applied to node 11, the output voltage V13 will transition correctly, namely from a low (L) to high (H) state. The signal transition at input node 11 causes control circuit 21 to turn on low magnitude current supply P-channel transistor 33 and thereby supply a relatively low current to the base of output transistor circuit 37.

The output of control circuit 21 is also coupled to delay circuit 25 which, for purposes of illustration, may impart a prescribed delay on the order of 50-100 nanoseconds. The output of delay circuit 25 thus goes high (H) for the duration of its time-out window, placing a high (H) voltage on the gate input to N-channel transistor 65, turning on transistor 65, so that a low (L) or ground is applied via link 64 to the gate input of inverter 61, causing its output to go high. The low voltage at the output of delay circuit 25 also turns of P-channel transistor 66 so as to interrupt the drain bias path of inverter 62. Thus, during the time window imparted by delay circuit 25, the output of the delay circuit effectively overrides the operation of the sense circuit 51 and has exclusive control over the operation of the main current control circuit 23. Since the output V61 of inverter 61 on line 24-3 is forced high (H) by turned-on transistor 65, each of the inputs to NAND gate 24 is high (H), so that its output goes low, turning on main drive P-channel FET current source transistor 43. The main drive output current from current source transistor 43 is summed with the 'short circuit' drive current supplied by transistor 33 (which has been turned on by the input voltage V11, as described above). This combined current provides a substantial base drive for bipolar output transistor 37, so that a large output current is supplied at output node 13.

For the present case of a non-shorted output, upon the expiration of the time-out window of delay circuit 25, the voltage output V25 from delay circuit 25 changes state (goes low (L)), turning off N-channel transistor 65 and turning on P-channel transistor 66. Since the gate input to inverter 62 is high due to the high voltage output on node 13, the output of inverter 62 is low, so that a low gate voltage continues to be applied over link 64 to inverter 61. Consequently, each of the inputs to NAND gate 24 remains high (H), so that its output stays low, holding main drive P-channel FET current source transistor 43 in an on state, so that the relatively large base drive for bipolar output transistor 37 remains unabated, so that a large output current continues to be supplied at output node 13.

SHORTED-OUTPUT (FIG. 6)

Considering the case where output node 13 is shorted to a reference voltage (e.g. zero volts or grounded), then the voltage at output node 13 will not transition from low (L) to high (H). Namely, in response to a high-to-low transition of the input voltage V11 applied to node 11, the output voltage V13, rather than going from a low (L) to high (H) state, remains low (L). Since the output of control circuit 21 is coupled to delay circuit 25, the output of delay circuit 25 goes high (H) for the duration of its time-out window, placing a high (H) voltage on the gate input to N-channel transistor 65, turning on transistor 65, so that a low (L) or ground is applied via link 64 to the gate input of inverter 61, causing its output to go high. The low voltage at the output of delay circuit 25 also turns off P-channel transistor 66, so as to interrupt the drain bias path of inverter 62. Again, during the time window imparted by delay circuit 25, the output of the delay circuit 25 effectively overrides the operation of the sense circuit 51 and forces line 24-3 high (H), so that each of the inputs to NAND gate 24 is high (H), turning on main drive P-channel FET current source transistor 43. Thus, during the time-out window of delay circuit 25, a large output current is supplied at output node 13.

For the present case of a shorted output, upon the expiration of the time-out window of delay circuit 25, the voltage output V25 from delay circuit 25 changes state (goes low (L)), turning off N-channel transistor 65 and turning on P-channel transistor 66. Since the gate input to inverter 62 is low, due to the low voltage output on node 13, the output of inverter 62 is high, so that a high gate voltage is applied over link 64 to inverter 61. Consequently, input 24-3 to NAND gate 24 is low (L), causing its output to go high, thereby turning off main drive P-channel FET current source transistor 43 and reducing the base drive for bipolar output transistor 37 to only that provided by current source transistor 33, so that a relatively small 'short circuit' output current is supplied at output node 13.

As pointed out previously, in addition to limiting current to the 'short circuit' magnitude supplied by low magnitude current supply transistor 33, for the case of a shorted output having been detected by sense circuit 51 upon the termination of the time out window, sense circuit 51 also serves to detect a short circuit condition that may not manifest itself until after the expiration of the time-out window. In this latter case, with the voltage V25 being low (the time out imparted by delay circuit 25 has expired) and the with output of inverter 62 going high due to the drop in output voltage at node 13, the same control mechanism just described will disable second controllable current supply circuit 43, so as to terminate its supply of main current, thereby limiting the current supplied to the output node to the 'short circuit' value provided by only the first current supply circuit 33.

As will be appreciated from the foregoing description, the inability of conventional current driver mechanisms to both limit the magnitude of short circuit output current and also effectively supply the much larger output current that is required at the low end of its dynamic range is successfully addressed in accordance with the present invention. Fully driving the output current by enabling both low and high magnitude current sources allows the output impedance to be designed to a very low value (e.g. on the order of ten ohms). Using a limited time-out window to determine whether the output has tracked the input transition provides a dynamic mechanism for identifying a short circuited output within a timespan that will not subject the circuit components to a potentially damaging overcurrent condition, without limiting the full current drive capability of the circuit.

While I have shown and described an embodiment in accordance with the present invention, it is to be understood that the same is not limited thereto but is susceptible to numerous changes and modifications as known to a person skilled in the art. Such modifications may include, but are not limited to a complementary circuit employed to implement a current sink driver in complementary association with the source driver circuit, as explained previously. Also the field effect transistor current source circuits may be summed directly as an output driver pair without the use of a bipolar output transistor. It should also be realized that the control logic employed to perform supervisory signalling tasks is not limited to any particular type, and does not necessarily require an enable signal input, as in the foregoing embodiment. Similarly, the buffer stages are not limited to a specific number or type. As a consequence I do not wish to be limited to the details shown and described herein but intend to cover all such changes and modifications as are obvious to one of ordinary skill in the art.

What is claimed:

1. A current driver circuit comprising:
   an input node to which an input signal, which transitions from a first input signal level to a second input signal level, is applied;
   an output node from which an output signal, which normally transitions from a first output signal level to a second output signal level in accordance with said input signal transitioning from said first input signal level to said second input signal level, is derived;
   a controllable current supply circuit which controllably supplies an adjustable magnitude current to said output node; and
   an output signal transition sensing circuit, which is coupled to said output node and to said controllable current supply circuit, and which causes said controllable current supply circuit to supply current of a first current level to said output node in response to the application of said input signal to said input node and, in response to said output signal having failed to transition from said first output signal level to said second output signal level upon the expiration of a prescribed period of time subsequent to the application of said input signal to said input node, causes said controllable current supply circuit to supply current of a second current level to said output node, said second current level being less than said first current level, but of a level sufficient to maintain current flow from said controllable current supply circuit to said output node.

2. A current driver circuit according to claim 1, wherein said controllable current supply circuit comprises a first controllable current source which controllably supplies a first current of a first magnitude to said output node, and a second controllable current source which controllably supplies a second current of a second magnitude to said output node, said second magnitude being larger than said first magnitude, and wherein said output signal transition sensing circuit has an output coupled to said second controllable current source, and controls said second controllable current source to supply said second current to said output node in response to the application of said input signal to said input node, but, in response to said output signal having failed to change from said first output signal level to said second output signal level upon the expiration of said prescribed period of time subsequent to the application of said input signal to said input node, causes said second controllable current source to terminate its supply of said second current to said output node, while leaving said first controllable current source turned-on and thereby supplying said first current of said first magnitude to said output node, said first magnitude corresponding to said second current level, which is sufficient to maintain current flow from said first controllable current source to said output node.

3. A method of controlling the operation of a current driver circuit which controllably supplies an adjustable level drive current to an output node in accordance with an input signal applied to an input node, said input signal transitioning from a first input signal level to a second input signal level, said output node providing an output signal, which normally transitions from a first output signal level to a second output signal level in accordance with said input signal transitioning from said first input signal level to said second input signal level, said method comprising the steps of:
   (a) in response to said input signal transitioning from said first input signal level to said second input signal level, causing said current driver circuit to supply a drive current of a first current level to said output node; and
   (b) in response to said output signal having failed to transition from said first output signal level to said second output signal level upon the expiration of a prescribed period of time subsequent to said input signal transitioning from said first input signal level to said second input signal level, causing said current driver circuit to supply drive current of a second current level to said output node, said second current level being less than first current level, but of a level sufficient to maintain current flow from said current driver circuit to said output node.

4. A method according to claim 2, wherein said current driver comprises a first controllable current source and a second controllable current source, said second controllable current source being operative to supply a second current having a second magnitude larger than a first magnitude of a first current controllably supplied by said first controllable current source, and wherein step (b) comprises causing said first and second controllable current sources to supply said first and second currents to said output node in response to said input signal transitioning from said input signal level to said second input signal level and, in response to said output signal at said output node having failed to transition from said first output signal level to said second output signal level upon the expiration of said prescribed period of time subsequent to said input signal transitioning from said first input signal level to said second input signal level, causing said second controllable current source to terminate its supply of said second current to said output node, leaving current flowing from said first controllable current source to said output node.

* * * * *